United States Patent [19]

Harvey

[11] 4,051,497
[45] Sept. 27, 1977

[54] PROGRAMMED EXPOSURE CONTROL APPARATUS

[75] Inventor: Donald Malcolm Harvey, Webster, N.Y.

[73] Assignee: Eastman Kodak Company, Rochester, N.Y.

[21] Appl. No.: 653,065

[22] Filed: Jan. 28, 1976

[51] Int. Cl.² .......................... G03B 9/00; G03B 7/14
[52] U.S. Cl. ........................................ 354/231; 354/29
[58] Field of Search .................... 354/26, 29, 30, 42, 354/49, 271, 40, 43, 228, 36, 38, 31, 231

[56] References Cited

U.S. PATENT DOCUMENTS

| | | | |
|---|---|---|---|
| 3,353,462 | 11/1967 | Suzuki | 354/43 |
| 3,479,935 | 11/1969 | Harvey | 354/50 |
| 3,672,267 | 6/1972 | Harvey et al. | 354/29 |
| 3,777,637 | 12/1973 | Kuramoto et al. | 354/42 |
| 3,893,134 | 7/1975 | Brauning | 354/30 |
| 3,906,516 | 9/1975 | Harvey | 354/27 |

*Primary Examiner*—L. T. Hix
*Assistant Examiner*—William B. Perkey
*Attorney, Agent, or Firm*—Dennis P. Monteith

[57] ABSTRACT

Exposure control apparatus provides an exposure program in which an exposure aperture is related to shutter speed to produce an optimum compromise between both exposure parameters. The exposure control apparatus comprises a diaphragm defining an exposure aperture of variable size, and a shutter comprising first and second selectively movable shutter blades for sequentially uncovering and covering the exposure aperture, respectively, during an exposure interval. Shutter speed is varied automatically by moving the second blade a variable time before commencing movement of the first shutter blade. The second shutter blade and diaphragm are coupled together by a control member such that the aperture size as well as exposure interval are varied in proportion to each other prior to an exposure. A movable latch member operably associated with a level-sensing light-sensitive circuit latches the diaphragm in an aperture regulating position which is functionally related to scene light intensity. As the diaphragm is latched the first shutter blade is synchronously actuated to uncover the exposure aperture. The time difference between the initial movement of the second shutter blade and the first shutter blade not only determines the exposure interval but also determines exposure aperture size. With this arrangement an exposure program exists providing an optimum compromise between exposure interval and aperture size wherein (1) under bright light conditions the exposure aperture is small and the exposure interval short, and (2) under low light conditions the aperture is large and the exposure interval relatively long.

2 Claims, 8 Drawing Figures

PROGRAMMED EXPOSURE CONTROL APPARATUS

BACKGROUND OF THE INVENTION

1. Field of the Invention

The invention relates to exposure control apparatus for use in a camera, and in particular to exposure control apparatus for providing an exposure program related to scene light intensity in which the size of an exposure aperture is proportional to exposure time.

2. Description of the Prior Art

When taking photographs there are two competing, and often times conflicting, parameters to be considered. These two parameters are the shutter speed, or exposure time, and the camera lens aperture size or $f$-number. Maximum depth of field is obtained with the smallest aperture size (highest $f$-number); and fast shutter speeds (short exposure times) are capable of "freezing" moving objects in the scene to be photographed. While there are some applications where a camera operator might want an extremely small depth of field or a blurred image indicative of motion, generally the camera operator prefers both a large depth of field and an ability to "freeze" motion. But unless the camera operator is very fortunate to be photographing an unusually bright scene, he must sacrifice to some extent the depth of field or the shutter speed, or both, in order to receive a sufficient amount of light to expose the film properly. Whether to increase the aperture size (decrease the $f$-number) or slow the shutter speed (increase the exposure time) or do both is a choice a professional photographer usually makes based upon his experience and knowledge of the art. On the other hand, there is a large class of photographers who do not want to be troubled with making the choice between shutter speed and aperture size and who prefer simply to press a shutter release button and take a picture. For these photographers, it is desirable to incorporate into the camera some means for automatically setting both the shutter speed and the aperture size in response to scene illumination. Further, the relationship between aperture size and shutter speed, i.e., the shutter program, should in many situations be a compromise between aperture size and shutter speed-not a sacrifice of one for the other.

Exposure control apparatus is known in the art that provides an exposure program in which the size of an exposure aperture is proportional to an exposure interval, e.g. the larger the aperture size the longer the exposure interval and the smaller the aperture the shorter the exposure time, to produce an optimum compromise between both exposure parameters. In particular, apparatus is known for "compromising" aperture size and shutter speed and, in doing so, the exposure aperture is established prior to shutter opening movement. For example, U.S. Pat. No. 3,893,134, assigned to the assignee of the present invention, discloses exposure control apparatus comprising a shutter and a photoconductively controlled diaphragm which forms a variable exposure aperture between a minimum and a maximum size. The diaphragm is latched to set the exposure aperture with the size thereof being determined by the light level sensed by the photoconductive element. As the exposure aperture is set, a movable control member is synchronously actuated. At a later time which is related to scene light intensity, the control member releases the shutter to uncover the exposure aperture. At a still later time, a closing member is actuated to permit the shutter to move to cover the exposure aperture, thereby terminating the exposure interval. The time interval between when the control member releases the shutter to begin the exposure interval and when the closing member is released to terminate the exposure interval is directly proportional to exposure aperture size. Thus, a large aperture size indicating a low level of light intensity results in a large exposure interval, and a small aperture size indicating a high level of light intensity results in a small exposure interval.

The exposure program disclosed in the aforementioned U.S. Pat. No. 3,893,134 suffers from a disadvantage in that under all scene light conditions, except extreme low light conditions, a time delay exists between when the diaphragm is set and when the shutter is opened. This delay prolongs the period between when the camera is actuated and when an exposure is terminated as well as increases the possibility that an exposure will be effected under scene light conditions different from the conditions under which the diaphragm was set and the shutter was intended to be operated. Furthermore, the overall apparatus disclosed therein is relatively complicated in that it involves several moving and interdependent elements which complicate assembly operations and affect overall production cost. The attractiveness of an exposure control mechanism is related to the degree it is self-acting, its simplicity of design and cost of manufacture. Thus, it is desirable to have an automatic exposure control apparatus capable of achieving the above discussed exposure program while not sacrificing simplicity and cost.

SUMMARY OF THE INVENTION

It is therefore an object of the present invention to provide an improved exposure control apparatus which operates automatically in accordance with scene light intensity for achieving a compromise between depth-of-field and shutter speed.

It is another object of the invention to provide improved programmed exposure control apparatus in which an exposure interval is commenced in synchronism with establishment of an exposure aperture.

Another object of the present invention is to provide exposure control apparatus of the aforementioned kind which is of simple design and construction and economical to manufacture.

In accordance with the above objects, a photographic camera includes diaphragm means for defining an exposure aperture of variable size, and shutter means movable over a range of positions for defining an exposure interval of variable duration. Moving means is provided for concurrently actuating the shutter means and diaphragm means to adjust the exposure interval in proportion to the exposure aperture, prior to an exposure. Latching means secures the diaphragm means in a particular aperture defining position while synchronously actuating the shutter means to commence an exposure interval. With the aforementioned camera apparatus an exposure is effected in which the exposure interval is proportional to the magnitude of the exposure aperture.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF A PREFERRED EMBODIMENT

Because photographic cameras are well known, the present description will be directed in particular to elements forming part of, or cooperating more directly with, apparatus in accordance with the present invention. It is to be understood that camera elements not specifically shown or described may take various forms well known to those having skill in the art.

Figures 1, 2:
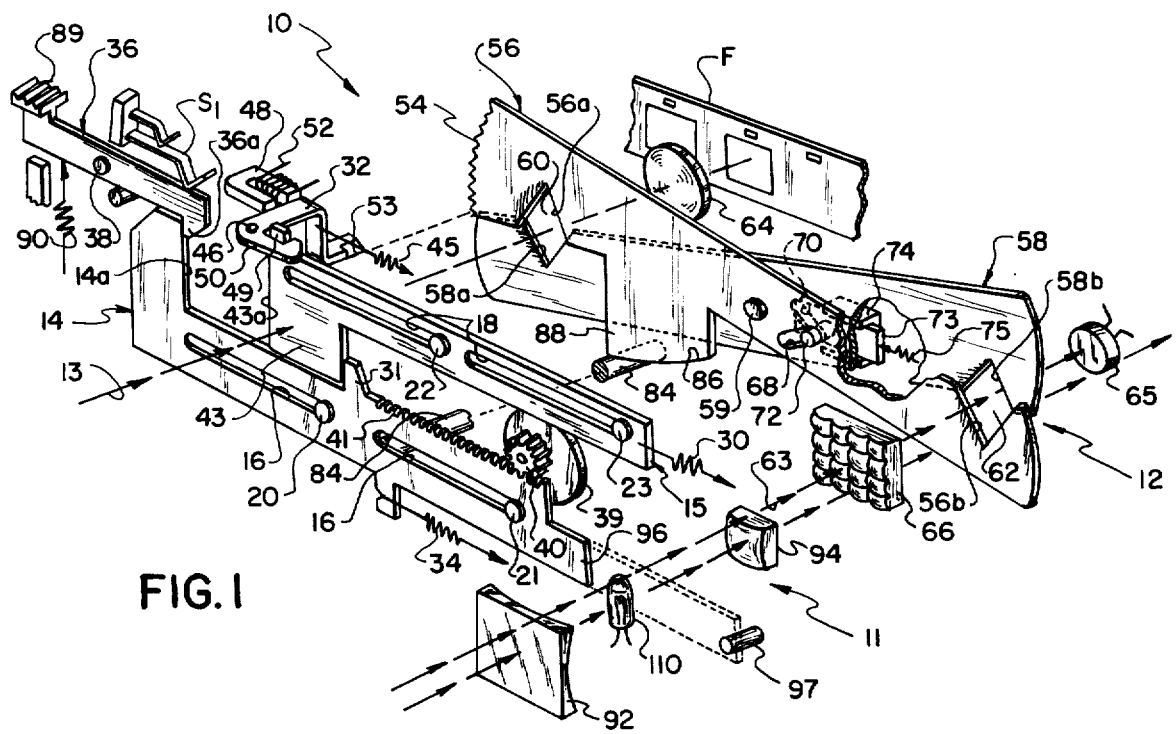
FIG. 1 is an exploded perspective view of a presently preferred embodiment of a programmed exposure control apparatus in accordance with the present invention.
FIG. 2 is a schematic drawing of an electrical circuit for controlling operation of the exposure control apparatus shown in FIG. 1.

Shown in FIG. 1 is a presently preferred embodiment of a programmed exposure control mechanism, denoted generally 10, in accordance with the present invention. Exposure control mechanism 10 is programmed to produce an optimum compromise between aperture size and shutter speed for various levels of scene illumination and comprises a shutter mechanism 11 and a diaphragm mechanism 12 for regulating the passage of light from a scene being photographed along an optical axis 13. Shutter mechanism 11 includes a pair of shutter blades 14, 15, shutter blade 14 being a shutter closing blade and blade 15 being the shutter opening blade. Shutter blades 14, 15 are retained in a common vertical plane by guide means (not shown) and include a pair of slots 16, 18 for slidably mounting the blades on pins 20, 21 and 22, 23, respectively, attached to a camera support plate (also not shown).

Opening blade 15 is releasably retained in a light blocking position, shown in FIG. 1, against the influence of its bias spring 30 by means of either a spur 31 integral with closing blade 14 or a spring biased blocking armature 32. A description of the manner in which blade 15 is released from its light blocking position to initiate an exposure interval is set forth in detail hereinafter.

Closing blade 14 which can be alternatively referred to as a light regulating member is releasably retained in an initial light unblocking position, also shown in FIG. 1, against the influence of its bias spring 34 by means of a spring biased shutter release member 36 mounted for pivotal movement about a pivot pin 38. In the position shown in FIG. 1, release member 36 maintains a control switch S1 in a normally open position and prevents closing blade 14 from moving under the influence of spring 34.

The speed at which blade 14 moves is retarded by an inertial flywheel 39. Flywheel 39 is mechanically connected to a spur gear 40 which rotatably engages a toothed edge 41 of blade 14. The speed at which closing blade 14 advances may be controlled by varying the amount of retardation applied by flywheel 39, or the force produced by spring 34, or both, whereas the speed at which blade 15 moves is determined by the force of spring 30. It shall be clear to those skilled in the art that blades 14, 15 may be moved at the same speed or at different speeds relative to each other.

Spur 31 also constitutes means for returning shutter opening blade 15 to its cocked, light blocking position when closing blade 14 is returned to its initial light unblocking position following an exposure. To reset or cock shutter 11, shutter blade 14 is coupled to a conventional shutter reset member (not shown) which may consist of any movable member that may also operate to advance film after an exposure. For a detailed description of one type of a shutter reset mechanism, reference is made to U.S. Pat. No. 3,911,455, the disclosure of which is incorporated herein by reference. Following an exposure, the reset member is actuated to move blade 14 from right to left. As this movement occurs, spur 31 abuttingly engages opaque projection 43 to move opening blade 15 back to its cocked position.

A spring 45 biases armature 32 in a clockwise direction as viewed in FIG. 1 about a pivot 46. When opening blade 15 is in its light blocking position, armature 32 is urged adjacent the poles of a holding magnet 48 by shutter detent 49 wherein armature finger member 50 partially surrounds the shutter detent. When electrical current is caused to flow through a coil 52, holding magnet 48 is energized to magnetically latch armature 32 in its shutter blade retaining position whereby finger 50 prevents opening blade 15 from moving from its light blocking position. When holding magnet 48 is de-energized, opening blade 15 is retained in its light blocking position as long as closing blade 14 is in its initial light unblocking position. Otherwise, blade 15 is moved from its light blocking position under the influence of spring 30 to commence an exposure. As such movement commences, detent 50 and spring 45 pivot armature 32 in the clockwise direction to a diaphragm latch position wherein beveled edge 53 synchronously engages a serrated edge 54 of diaphragm 12.

As shall be clear to those skilled in the art, the shutter speed or the time light is permitted to impinge on film F is proportional to the relative speed at which blades 14, 15 advance and the distance between leading edge 14a of closing blade 14 and the trailing edge 43a of opening blade 15 when an exposure is initiated. Shutter mechanisms in which a pair of spaced opaque blades are moved concurrently with the shutter speed being functionally related to the distance between the blades are known in the art. For an additional description of other shutter mechanisms of this general type, reference is made to the U.S. Pat. Nos. 3,082,673 and 3,479,935, the disclosures of which are incorporated herein for reference.

Diaphragm mechanism 12 comprises a pair of opaque diaphragm blades 56, 58 positioned behind shutter blades 14, 15, as viewed in FIG. 1, for pivotable movement relative to each other about a pivot pin 59 which is attached to a camera support plate (not shown). Diaphragm blades 56, 58 are provided with V-shaped indentations or notches 56a, 56b and 58a, 58b, respectively, which cooperatively form a camera lens exposure aperture 60 in alignment with optical axis 13 and an aperture 62 in alignment with an optical axis 63. As shown, an objective 64 is located along axis 13 to direct light from a scene being photographed onto film F located at a film exposure plane, and a photoconductive element, such as a photoresistor 65, is located along axis 63 in alignment with a bee's eye lens 66 and aperture 62.

It is desirable that both diaphragm blades 56, 58 pivot about pin 59 in such a manner as to keep the center of apertures 60, 62 aligned with the optical axis of objective 64 and photoresistor 65, respectively. For this purpose, a pair of intersecting, elongated slots 68, 70 are formed from blades 56, 58, respectively, and a pin 72 is received in both slots at their area of intersection to link the blades together. Pin 72 is secured to a spring biased plate 73 which is located within a fixed guide member 74 for slidable movement in a direction normal to axes 13, 73 under the influence of spring 75. With this arrangement blades 58, 56 are biased in the clockwise and counterclockwise directions, respectively, by pin 72. When pin 72 moves from right to left under the influence of spring 75, blade 56 pivots counterclockwise whereas blade 58 simultaneously pivots in the clockwise direction whereby optical alignment is maintained between apertures 60, 62 and objective 64 and photoresistor 65, respectively. Since the amount to which the diaphragm blades can overlap each other is variable, lens exposure aperture 60 and aperture 62 are variable in proportion to each other. By virtue of the location and configuration of notches 56a, 57b and 58a, 58b the light projected toward film F is in proportion to the light impinging on photoresistor 65.

The relative positions of diaphragm blades 56, 58 are determined by an aperture set pin 84 which is fixedly attached to shutter closing blade 14 and extends beneath diaphragm 12 as diagrammatically shown in FIG. 1. Pin 84 abuttingly engages bevel surface 86 formed from central portion 88 of blade 56 and thereby maintains both diaphragm blades in an exposure aperture regulating position against the influence of bias spring 75. In the aforementioned initial light unblocking position of shutter closing blade 14, in 84 maintains blades 56, 58 in a position which results in a maximum size for both apertures 60, 62. However, when blade 14 is released to advance from left to right, aperture set pin 84 moves synchronously therewith across surface 86 thereby permitting blades 56, 58 to pivot in opposed directions under the influence of pin 72 to reduce apertures 60, 62. Bevel surface 86 is configured such that as blades 56, 58 pivot, the magnitude of exposure aperture 60 is inversely proportional to the distance between shutter blade edges 14a, 43a. In other words, exposure aperture 60 is varied in proportion to the speed at which shutter 11 is to be operated during an exposure.

An exposure control circuit 100 shown in FIG. 2 is instantly energized by means of a battery 102 when switch S1 is closed. Photoresistor 65, which, as is known in the art, has a resistance inversely proportional to the intensity of light impinging thereon, is connected in series with a resistor 104 to form a voltage divider circuit. The voltage at junction 105 serves as an input signal to a voltage-sensitive trigger circuit 107. The output of circuit 107 is connected in series with the aforementioned coil 52. Circuit 107 has an output which is normally conducting as long as the voltage at junction 105 is below a particular level relative to a bias signal which in this case is provided by battery 102 by means of conductor 108. The resistance of resistor 104 and the optical-electrical characteristics of photoresistor 65 are selectively controlled such that the voltage signal at junction 105 is adequate to turn the output of trigger circuit 107 OFF once the amount of light impinging on photoresistor 65 drops below a predetermined level.

A low light indicator lamp 110 may be connected in parallel across photoresistor 65 to provide a visible signal for the camera operator when scene light is below a level insufficient to produce a given exposure value within a predetermined time interval, for example 1/30 second. With this arrangement, it is preferred that lamp 110 is voltage-sensitive to have an abrupt turn ON-turn OFF characteristic.

An alternative preferred embodiment is to connect the input of a second voltage sensitive trigger to junction 105 with the output of such circuit connected in series with the indicator lamp. In this case, such second trigger circuit, although voltage-sensitive would have a switching characteristic which is the reverse of circuit 107. That is, such circuit would have an output which would turn OFF when its input voltage signal exceeded a given level relative to its bias signal. This arrangement also would provide an abrupt turn OFF-turn ON characteristic for the indicator lamp, but offers the advantage that the lamp need not be voltage-sensitive.

To obtain a photographic exposure, the camera operator depresses button 89 of shutter release member 36 in a counterclockwise direction against the influence of a retaining spring 90. During initial movement of release member 36, switch S1 closes to thereby instantly energize electronic circuit 100. Photoresistor 65 immediately senses the level of scene illumination projected along optical axis 63. However, member 36 is configured so that when switch S1 is initially closed blade 14 is still retained in its initial position by hook-portion 36a.

If scene illumination is below the aforementioned level necessary to achieve a particular exposure value in 1/30 second, the voltage at junction 105 turns low light indicator lamp 110 ON. The signal from the low light lamp is visible within the field-of-view of a viewfinder 92 by means of a lens 94 as a warning to the camera operator that film F will be underexposed if shutter 11 is caused to be opened. In this low light condition the voltage at junction 105 turns the output of trigger circuit 107 OFF, thereby de-energizing coil 52. Therefore, if the operator continues to actuate shutter release lever 36, shutter closing blade 14 will be disengaged from hook 36a and begin to advance under the influence of bias spring 34. Since coil 52 is de-energized, holding magnet 48 is also de-energized. Shutter blade 15 and armature 32 are therefore immediately free to move under the influence of their respective bias springs to commence an exposure and to engage serrated edge 54, respectively. When the latter occurs, the lowermost notch of edge 54 is engaged by edge 53 and diaphragm blades 56, 58 are latched in their full, or largest, aperture determining position. The resultant exposure will thus be made at the largest possible exposure aperture and at the slowest shutter speed since shutter blades 14, 15 are separated the greatest distance at the commencement of the exposure interval.

If an exposure is effected when lamp 110 is ON, closing blade 14 is provided with an elongate projection 96 so that light from the lamp is obstructed from view when the closing blade has partially advanced, as shown by the dashed lines of FIG. 2. The light from lamp 110 is visible in viewfinder 92 only between the time shutter release 36 is actuated enough to close switch S1 and the time at which shutter closing blade 14 advances to the point that projection 96 covers light from view through viewfinder 92. Thus if the camera operator elects to take a photograph in spite of the occurrence of the low light warning signal, such signal will not be visible through viewfinder 92 during exposure.

In discussing the operation of circuit 100 under scene light conditions which are adequate to effect the aforementioned particular exposure value in less than 1/30 second it is helpful to consider various scene illumination levels. Suppose first that the scene illumination sensed by the photoresistor 65 is low, yet above the level which causes lamp 110 to be energized. In this case, the voltage at junction 105 is not adequate to energize low light indicator lamp 110, nor is it sufficient with a wide open exposure aperture 60 to switch trigger circuit 107 to thereby de-energize coil 52. Therefore, as the camera operator fully actuates shutter release lever 36, closing blade 14 is released as before but this time holding coil 52 is energized, and armature 32 is magnetically latched in its shutter blade retaining position shown in FIG. 1. Opening blade 15 is therefore prevented from advancing with closing blade 14. As closing blade 14 advances, aperture set pin 84 moves from left to right thereby permitting diaphragm blades 56, 58 to pivot in opposed directions with bevel surface 86 being urged against the aperture set pin. As this movement occurs, both lens exposure aperture 60 and photoresistor aperture 62 diminish in size in proportion to each other. Electronic circuit 100 is so designed that when the level of scene illumination impinging on photorresistor 65 is reduced to a predetermined value (by reducing aperture 62), the voltage at junction 105 causes trigger circuit 107 to de-energize coil 52. When this happens, holding magnet 48 is de-energized whereby armature 32 is no longer magnetically latched. Armature 32 therefore immediately pivots to engage serrated edge 54 thereby preventing pin 72 from moving diaphragm blades 56, 58 and further diminishing the size of apertures 60, 62. As armature pivoting movement occurs, opening blade 15 is released and advances under the infleunce of spring 30. This time, since closing blade 14 has already had some time in which to advance it follows behind opening blade 25 by a shorter distance. Hence, shutter speed is somewhat faster and the exposure aperture 60 somewhat smaller than for the extreme low light condition previously considered. Few bright scenes, diaphragm blades 56, 58 close more than for dimly lit scenes before the level of scene illumination incident upon photoresistor 65 is reduced to the aforementioned predetermined level. In this manner, bright scenes are exposed with an even smaller exposure aperture and faster shutter speed than dimly lit scenes.

In summary, once shutter release button 89 has been depressed to release closing blade 14, diaphragm blades 56, 58 are closing under the influence of pin 72. At some point the light level reaching photoresistor 65 is diminished to the predetermined value necessary to switch voltage sensitive circuit 107. When this occurs, current ceases to flow through coil 52, diaphragm 12 is latched in a particular aperture determining position, and shutter 11 is released to uncover the exposure aperture. From the forgoing, it shall be clear to those skilled in the art that the size of the exposure aperture is proportional to the exposure time or vice versa with both exposure parameters being functionally related to scene illumination.

Figure 3:
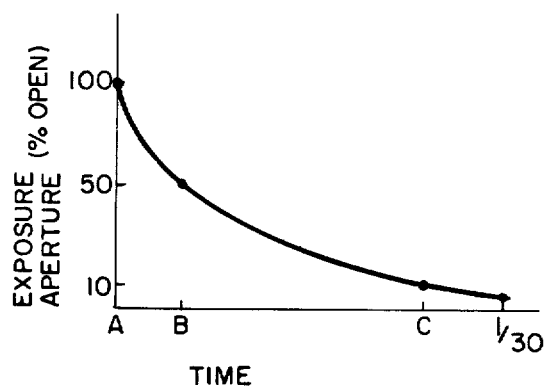
FIGS. 3, 4 and 5 show graphs of various exposure parameters as a function of time.

In order to even more clearly point out the exposure program produced by the exposure control mechanism 10 of FIG. 1, refer now to FIGS. 3 through 8. FIG. 3 shows a plot of the percentage exposure aperture 60 is open as a function of time. Initially, at point A, exposure aperture 60 is 100% open; but as closing blade 14 advances, aperture set pin 84 moves permitting diaphragm 12 to move to diminish the size of apertures 60, 62. At some later time represented by points B and C, the size of aperture 60 had diminished to 50% and 10%, respectively, of its initial value. It will be apparent that a different plot of lens exposure aperture vs. time can be obtained by altering the slope of bevel surface 86. The example illustrated in FIG. 3 is merely one of many possibilities; the desired relationship between the lens exposure aperture and time will depend upon the particular application for which the exposure control mechanism is designed.

Figure 4:
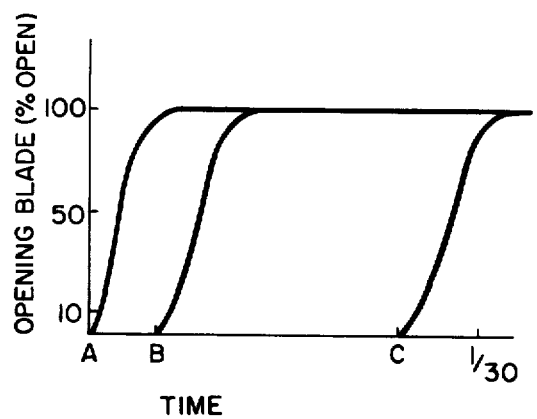

Referring now to FIG. 4, a plot is given of the percentage of exposure aperture 60 which is uncovered by opening blade 15, as a function of time. It will be recalled from the discussion in connection with FIGS. 1 through 3 that the exact time at which opening blade 15 begins to advance, and thus begins to uncover exposure aperture 60 is determined when coil 52 is de-energized. The de-energization of coil 52 is, in turn, determined by the level of scene illumination incident upon photoresistor 65. Considering the three reference times A, B and C previously discussed in connection with FIG. 3, it is apparent that if coil 52 is de-energized at a time corresponding to reference point A, i.e., simultaneous with the full actuation of release lever 36, then this would correspond to a low light level scene. Similarly, if opening blade 15 is not released until the time corresponding to reference point B, then the scene light is of a medium intensity level. Lastly, if the release of opening blade 15 is delayed until Point C, scene light is of a high intensity level. Thus the actual shape of the curve is identical regardless of when opening blade 15 is released, the only difference being that the curve is shifted along the abscissa to reflect the exact time the opening blade is released.

Figure 5:
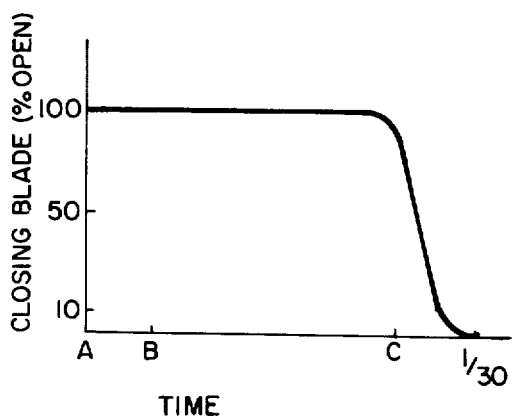

Opening blade 15 uncovers exposure aperture 60 in the manner previously discussed. It is for closing blade 14 to cover aperture 60 and thus terminate the exposure. FIG. 5 illustrates the percentage the exposure aperture 60 is covered by closing blade 14 as a function of time. Since closing blade 14 is always released upon full actuation of shutter release lever 36, the curve is always as shown in FIG. 5 regardless of the level of scene illumination incident upon photoresistor 65. The time for blade 14 to travel from its initial light unblocking position to its exposure terminating position abutting stop member 97 may, for example, be 1/30 second as illustrated in FIG. 5.

Figure 6:
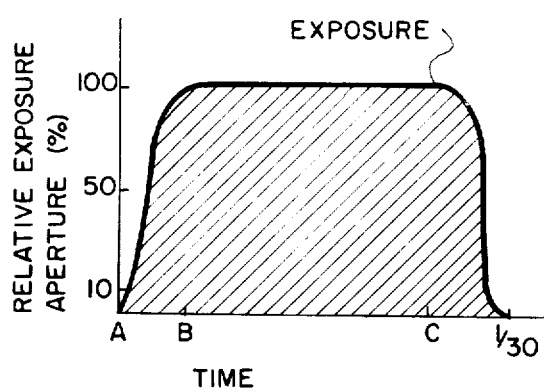
FIGS. 6, 7 and 8 are graphical illustrations of exposure aperture size and shutter speed for various scene light conditions.
Figure 7:
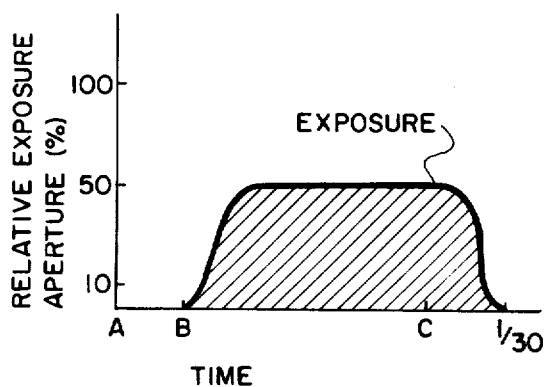
Figure 8:
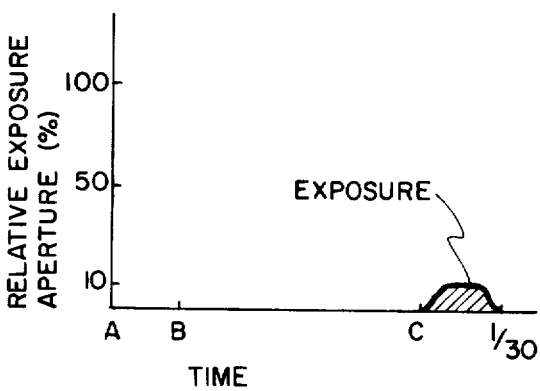

The exposure received by film F is a combination of the events discussed in connection with FIGS. 3, 4 and 5, and is illustrated in FIGS. 6 through 8 for the scene light conditions discussed previously. FIG. 6 shows the exposure received by film F when the scene is of a low light level, i.e., one in which opening shutter blade 15 is released by armature 32 at a time corresponding to reference point A. Since opening blade 15 is released immediately, armature 32 pivots to latch diaphragm blades 56, 58 in the wide open aperture position. Then opening blade 15 and closing blade 14 sweep across the wide open exposure aperture 60 giving film F the exposure shown in FIG. 6 which corresponds to slowest shutter speed, or longest exposure interval, and largest exposure aperture.

For a scene of medium light level, the release of armature 32 is delayed until a time corresponding to reference point B shown in FIG. 7. At that time, opening blade 15 is released and diaphragm 12 is synchronously latched. Now opening blade 15 and closing blade 14 sweep across exposure aperture 60 to produce an exposure shown in FIG. 7. It will be noted that the shutter speed, determined by subtracting the time represented by B from the exemplary 1/30 second, is faster, i.e., the exposure interval is shorter, than that shown in FIG. 6. This increase in shutter speed is due to the delay in de-energizing holding magnet 48. Thus, opening blade 15 and closing blade 24 form a smaller "window" which sweeps across aperture 60 in less time, thereby resulting in the faster shutter speed.

Depicted in FIG. 8 is the exposure program film F receives from a high light level scene. The operation of shutter 11 is the same as the operation discussed in reference to FIGS. 6 and 7, except that holding magnet 48 does not release armature 32 until a time corresponding to the reference point C. The result is that diaphragm 12 is latched in a position which yields an opening only 10% of the maximum opening size; and the "window" formed by opening blade 15 and the closing blade 14 is even smaller, resulting in a further increase in shutter speed.

Thus it is seen that exposure control mechanism 10 provides a larger exposure aperture and longer exposure interval for scenes having a relatively low light level, and a smaller exposure aperture and shorter exposure interval for scenes having a relatively high light level. It will be apparent to those skilled in the art that the three reference points A, B and C were chosen merely for the sake of discussion, and that in normal operation the shutter and diaphragm mechanisms will operate as discussed at some general reference point determined by the exact light level of the particular scene. It will be further apparent that since exposure control circuit 100 is not of the integrating light type, exposure depends only upon light level sensing and thus the photoelectronics do not have to be linear.

The invention has been described in detail with particular reference to a preferred embodiment thereof, but it will be understood that variations and modifications can be effected within the spirit and scope of the invention. For example, the small time lag between the time at which holding magnet 48 is de-energized and armature 32 actually latches diaphragm 12 may be compensated for by modifying photoresistor aperture 62 to take into account this time lag. Generally, this modification will result in making aperture 62 slightly smaller than exposure aperture 60 so that holding magnet 48 is de-energized slightly prematurely, thereby causing blades 56, 58 to be latched in a more proper position.

I claim:
1. In a camera having exposure control apparatus for controlling the amount of scene light reaching a film exposure plane, said exposure control apparatus including (1) a variable speed shutter having at least one light regulating member movable for varying an exposure interval, and (2) a diaphragm for defining an exposure aperture of variable size, said exposure control apparatus being of the type in which the duration of the exposure interval is proportional to the size of the exposure aperture to effect a compromise between shutter speed and depth of field, the improvement comprising:
control means for actuating said light regulating member and said diaphragm to establish an exposure interval and an exposure aperture prior to an exposure, said control means further defining means for setting said diaphragm in an exposure aperture defining position in synchronism with actuating said shutter to initiate an exposure independent of the particular combination of aperture size and shutter speed employed to effect an exposure.

2. In a camera having exposure control apparatus for controlling the amount of scene light reaching a film exposure plane, said exposure control apparatus including (1) a variable speed shutter for varying an exposure interval said shutter having an opening blade and a closing blade, and (2) a diaphragm for defining an exposure aperture of variable size, said exposure control apparatus being of the type in which the duration of the exposure interval is proportional to the size of the exposure aperture to effect a compromise between shutter speed and depth of field, the improvement comprising:
a. means for effecting concurrent movement of said shutter closing blade and said diaphragm prior to an exposure to vary the size of the exposure interval in proportion to variations in the size of the exposure aperture; and
b. latch means for setting said diaphragm at a particular light regulating position in synchronism with actuation of said shutter opening blade to commence an exposure interval, said latch means being adapted for synchronously setting and actuating said diaphragm and said shutter, respectively, independent of the particular combination of exposure aperture size and shutter speed used to effect an exposure.

* * * * *